(12) United States Patent
Anderson et al.

(10) Patent No.: US 6,993,440 B2
(45) Date of Patent: Jan. 31, 2006

(54) SYSTEM AND METHOD FOR WAVEFORM CLASSIFICATION AND CHARACTERIZATION USING MULTIDIMENSIONAL HIGHER-ORDER STATISTICS

(75) Inventors: Richard H. Anderson, Melbourne, FL (US); Edward R. Beadle, Melbourne, FL (US); Paul D. Anderson, Melbourne, FL (US); John F. Dishman, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 17 days.

(21) Appl. No.: 10/739,021

(22) Filed: Dec. 19, 2003

(65) Prior Publication Data
US 2004/0204878 A1  Oct. 14, 2004

Related U.S. Application Data

(60) Provisional application No. 60/458,038, filed on Mar. 28, 2003, provisional application No. 60/374,149, filed on Apr. 22, 2002.

(51) Int. Cl.
*G06F 19/00* (2006.01)

(52) U.S. Cl. .......................... 702/66; 702/70; 702/190; 324/76.12

(58) Field of Classification Search .................. 702/57, 702/66, 69–73, 75, 76, 179, 189, 190, 196, 702/147; 324/76.12, 76.13, 76.38; 375/316, 375/340, 229, 279, 285
See application file for complete search history.

(56) References Cited

U.S. PATENT DOCUMENTS

| 4,166,980 | A | * | 9/1979 | Apostolos et al. ........... 375/316 |
| 4,506,225 | A | * | 3/1985 | Loveless et al. ............ 324/334 |
| 4,607,305 | A |   | 8/1986 | Milo |
| 4,965,732 | A |   | 10/1990 | Roy, III et al. |
| 5,283,813 | A |   | 2/1994 | Shalvi et al. |
| 5,381,450 | A | * | 1/1995 | Lane .......................... 375/340 |

(Continued)

FOREIGN PATENT DOCUMENTS

FR  2713799 A1  *  6/1995

OTHER PUBLICATIONS

Inouye, Y. et al. "Cumulant-based Blind Identification of Linear Multi-input-multi-output Systems Driven by Colored Inputs", Jun. 1997, IEEE Trnasactions on Signal Processing. vol. 45, Issue 6. pp. 1543-1552.*

(Continued)

*Primary Examiner*—Marc S. Hoff
*Assistant Examiner*—Manuel L Barbee
(74) *Attorney, Agent, or Firm*—Duane Morris LLP

(57) ABSTRACT

A receiver exploits unique higher order statistics of temporally dependent waveforms to classify, characterize, identify (fingerprint) and intercept a waveform within the field of view of the receiver. The method uses $4^{th}$-order non zero lag auto cumulants of the received waveform and $4^{th}$-order non zero lag auto cumulants of known waveforms to classify and characterize the signal. The receiver includes a multi-element array and does not need a priori knowledge of the transmitted signal source obtain a fingerprint.

57 Claims, 13 Drawing Sheets

U.S. PATENT DOCUMENTS

| | | | |
|---|---|---|---|
| 5,459,668 A * | 10/1995 | Dogan et al. | 701/223 |
| 5,539,832 A | 7/1996 | Weinstein et al. | |
| 5,640,419 A | 6/1997 | Janusas | |
| 5,651,030 A * | 7/1997 | Wong et al. | 375/316 |
| 5,706,402 A | 1/1998 | Bell | |
| 5,848,160 A | 12/1998 | Cai et al. | |
| 5,893,031 A * | 4/1999 | Hoogerwerf et al. | 455/410 |
| 5,909,646 A | 6/1999 | Deville | |
| 5,996,406 A * | 12/1999 | Ward | 73/290 R |
| 6,185,309 B1 | 2/2001 | Attias | |
| 6,208,295 B1 | 3/2001 | Doğan et al. | |
| 6,252,962 B1 | 6/2001 | Sagey | |
| 6,426,977 B1 | 7/2002 | Lee et al. | |
| 6,449,560 B1 | 9/2002 | Kimball | |
| 6,535,666 B1 | 3/2003 | Dogan et al. | |
| 2002/0153891 A1 | 10/2002 | Smith et al. | |

OTHER PUBLICATIONS

Marchand, P. et al., "Multiple Hypothesis Modulation Classification Based on Cyclic Cumulants Different Orders," 0-7803-4428-6/98 IEEE, pp. 2157-2160.*

Swami, A. et al., "Hierarchical Digital Modulation Classification Using Cumulants," IEEE Transactions on Communications, vol. 48, No. 3, Mar. 2000, pp. 416-429.*

Haardt, M. et al. "Improved Bearing and Range Estimation via High-order Subspace based Unitary ESPRIT", 1996 Conference Record on the Thirtieth Asilomar Conference on Signals, Systems and Computers, vol. 1, pp. 380-384. Nov. 3-6, 1996.*

Dwyer, R. F. "Classification of very Wide Bandwidth Acoustic Signals", Oceans '97 MTS/IEEE Conference Proceedings, Oct. 6-9, 1997, vol. 1. pp. 496-499.*

Inouye, Y. et al. "Cumulant-based Blind Identification of Linear Multi-Input-Multi-Output Systems Driven by Colored Inputs", Jun. 1997, IEEE Transactions on Signal Processing. vol. 45, Issue 6, pp. 1543-5553.*

Abed-Meraim, K., Y. Xiang, J.H. Manton, and Y. Hua, "Blind Source Separation Using Second-Order Cyclostationary Statistics," IEEE Transactions on Signal Processing, vol. 49, No. 4, Apr. 2001, pp. 694-701.

Belouchrani, A., K. Abed-Meraim, J.F. Cardoso, and E. Moulines, "Blind Source Separation Using Second-Order Statistics," IEEE Transactions on Signal Processing, vol. 45, No. 2, Feb. 1997, pp. 434-444.

Biglieri, E., J. Proakis, and S. Shamai, "Fading Channels: Information-Theoretic and Communications Aspects," IEEE Transactions on Information Theory, vol. 44, No. 6, Oct. 1998, pp. 2619-2691.

Cardoso, J.F., "Blind Signal Separation: Statistical Principles," Proceedings of the IEEE, vol. 9, No. 10, Oct. 1998, pp. 2009-2025.

Cardoso, J.F. and B. Hvam Laheld, "Equivariance Adaptive Source Separation," IEEE Transactions on Signal Processing, vol. 44, No. 12, Dec. 1996, pp. 3017-3030.

Castedo, L. and A.R. Figueiras-Vidal, "An Adaptive Beamforming Technique Based on Cyclostationary Signal Properties," IEEE Transactions on Signal Processing, vol. 43, No. 7, Jul. 1995, pp. 1637-1650.

Chang, C., Z. Ding, S.F. Yau, and F.H.Y. Chan, "A Matrix-Pencil Approach to Blind Separation of Colored Non-Stationary Signals," IEEE Transactions on Signal Processing, vol. 48, No. 3, Mar. 2000, pp. 900-907.

Choi, S. and A. Cichocki, "Blind Separation on Non-stationary and Temporally Correlated Sources from Noisy Mixtures," Neural Networks for Signal Processing X, 2000. Proceedings of the 2000 IEEE Signal Processing Society Workshop, vol. 1, Dec. 2000, pp. 405-414.

Ding, Z. and T. Nguyen, "Stationary Points of Kurtosis Maximization Algorithm for Blind Signal Separation and Antenna Beamforming," IEEE Transactions on Signal Processing, vol. 48, No. 6, Jun. 2000, pp. 1587-1596.

Dogan, M.C. and J.M. Mendel, "Applications of Cumulants to Array Processing—Part I: Aperture Extension and Array Calibration," IEEE Transactions on Signal Processing, vol. 43, No. 5, May 1995, pp. 1200-1216.

Gabriel, W.F., "Adaptive Processing Array Systems," Proceedings of the IEEE, vol. 80, No. 1, Jan. 1992, pp. 152-162.

Godard, D.N., "Self-recovering Equalization and Carrier Tracking in Two-dimensional Data Communication Systems," IEEE Transactions on Communications, vol. COMM-28, Nov. 1980, pp. 1867-1875.

Kohno, R., "Spatial and Temporal Communication Theory Using Adaptive Antenna Array," IEEE Personal Communication, vol. 5, No. 1, Feb. 1998, pp. 28-35.

Krim, H. and M. Viberg, "Two Decades of Array Signal Processing Research," IEEE Signal Processing Magazine, Jul. 1996, pp. 67-94.

Marchand, P. and J-L Locoume, "Multiple Hypothesis Modulation Classification Based on Cyclic Cumulants of Different Orders," 0-7803-4428-6/98 IEEE, pp. 2157-2160.

Nikias, C.L. and J.M. Mendel, "Signal Processing with Higher-Order Spectra," IEEE Signal Processing Magazine, vol. 10, No. 3, Jul. 1993, pp. 10-37.

Roy, R., A. Paulraj, T. Kailath, "Direction-of-Arrival Estimation by Subspace Rotation Methods," Proc. ICASSP86, pp. 2495-2498.

Schmidt, R.O., "Multiple Emitter Location and Signal Parameter Estimation," IEEE Transactions on Antennas and Propagation, vol. AP-34, No. 3, Mar. 1986, pp. 276-280.

Swami, A. and B.M. Sadler, "Hierarchical Digital Modulation Classification Using Cumulants," IEEE Transactions on Communications, vol. 48, No. 3, Mar. 2000, pp. 416-429.

Tong, L., G. Xu, and T. Kailath, "Blind Identification and Equalization Based on Second-Order Statistics: A Time-Domain Approach," IEEE Transactions on Information Theory, vol. 40, No. 2, Mar. 1994, pp. 340-349.

Van Veen, B.D. and K.M. Buckley, "Beamforming: A Versatile Approach to Spatial Filtering," IEEE ASSP Magazine, Apr. 1988, pp. 4-24.

* cited by examiner

BPSK

16 QAM

SYSTEM AND METHOD FOR WAVEFORM CLASSIFICATION AND CHARACTERIZATION USING MULTIDIMENSIONAL HIGHER-ORDER STATISTICS

The present application is related to and co-pending with commonly-assigned U.S. patent application Ser. No. 10/360,631 entitled "Blind Source Separation Utilizing A Spatial Fourth Order Cumulant Matrix Pencil", filed on 10 Feb. 2003, the disclosure of which is hereby incorporated herein by reference.

The present application is related to and co-pending with U.S. Provisional Patent Application Ser. No. 60/374,149 filed 22 Apr. 2002 entitled "Blind Source Separation Using A Spatial Fourth Order Cumulant Matrix Pencil", the entirety of which is hereby incorporated herein by reference.

The present application is related to and co-pending with U.S. patent application Ser. No. 10/400,486 entitled "Method and System for Waveform Independent Covert Communications", filed 28 Mar. 2003 the entirety of which is hereby incorporated herein by reference.

The present application is related to and filed concurrently with U.S. patent application Ser. No. 10/739,022 entitled "Method and System for Tracking Eigenvalues of Matrix Pencils for Signal Enumeration", filed 19 Dec. 2003 the entirety of which is hereby incorporated herein by reference.

GOVERNMENT LICENSE RIGHTS

The U.S. government has a paid-up license in this invention and the right in limited circumstances to require the patent owner to license others on reasonable terms as provided for by the terms of Contract No. NRO000-02-C-0389 awarded by the National Reconnaissance Office.

BACKGROUND

Information on the location and type of an unknown emitter is a valuable commodity that can be used for exploitation of the emitter's signals. In modern warfare, troop movements, deployments and activity level can often by tracked, identified and quantified by the wireless traffic, the type of emitters used and specific emitter used. Information regarding location of a signal source such as for surveillance or combat search and rescue can also be of great value in the case of a downed pilot or a marked terrorist under surveillance. Additionally, command and control among conventional and/or special operation forces can be illuminated through their wireless communication.

Automatic recognition of digital modulation formats is also increasingly important as the number and sophistication of digital signaling system increase. There is an emerging need for intelligent receivers capable of quickly discriminating signal types. Modulation classification may be used to identify interferences or to choose the appropriate demodulator in the cooperative scenario.

FIG. 1 shows the power spectral densities for Phase shift keying (PSK)/Quadrature Amplitude modulation (QAM) waveforms (Binary PSK, Quadrature PSK 8PSK, 16-QAM, 64 QAM and 256 QAM. As clearly seen in FIG. 1 the power spectral densities for each of these waveforms are nearly identical. Therefore, prior art system using spectral densities are limited in their ability to discriminate and thus classify these waveforms.

Intentional detection of the signal or message can be accomplished in military systems that use specially designed electronic support measures (ESM) receivers. These ESM receivers are often found in signal intelligence (SIGINT) applications. In commercial applications, devices employed by service providers (i.e. spectral monitors, error rate testers) can be used to detect intrusion on their spectral allocation ESM/SIGINT systems often need to classify and/or characterize the waveforms of unknown source emitters within their field of view (FOV). Classification identifies the type of signal being emitted by the unknown emitter. Characterization is identifying the particularities of the signal that are a result of and stem from the actual emitter (specific emitter) used to transmit the signal. Characterization and classification and other parameters are collectedly referred to as waveform "fingerprinting". Waveform fingerprinting can support and improve the abilities of SIGINT system to perform modulation recognition, identify friend or foe emitters, intercept transmitted messages and characterize transmitter imperfections for example local oscillator phase jitter, non-linearities in the power amplifier, etc.

Many current emitter classification/characterization methods are based on second-order statistics (correlation) and power spectra estimation. Spectrum estimation identifies the waveform spectrogram to obtain the time-frequency characteristics while ignoring phase information that can provide additional beneficial information. Consider the example where a deceptive transmitter alters the channel filter (i.e., the Nyquist pulse shaping) between maximum phase and minimum phase realizations. Using only prior art power spectrum (or other prior art second-order techniques) estimation and ignoring phase, this type of modulation is undetectable. However, using the present inventive techniques, this type of modulation, as well as many others, can be detected, estimated, and classified using fourth-order domain statistics.

There are other current emitter classification/characterization methods known in the prior art that are based on higher-order statistic or polyspectra analysis. But these methods use third-order cumulants and corresponding bi-spectrum, zero-lag $4^{th}$-order cumulants and model based methods using $4^{th}$-order cumulant slices through possible combinations of lag triplets. These prior art methods neglect higher-order statistical structure at different time lags and use specific cumulant formulations not necessarily well-suited to signal characterization and classification. The present inventive techniques disclosed herein differ from the prior art higher-order statistics approach in that, for the inventive techniques, the basis for waveform characterization and classification uses a unique $4^{th}$-order cumulant definition, a multiplicity of lag triplet choices, and a unique matrix pencil formulation to form a complex 3-D $4^{th}$-order cumulant matrix volume. The data in the cumulant volume is used in its entirety as the basis of discrimination. Further, this method is general and applicable to an extremely broad range of signal characterization and classification problems.

The present subject matter provides new statistical features, or "3-D fingerprints" for emitter waveform classification and characterization. The subject matter exploits the full multidimensional volume of higher-order cumulants' variations over different lag combinations rather than just single zero-lag cumulant values or cumulant slices along one non-zero lag as used in some prior art methods. The present subject matter augments existing methods for signal classification and is complementary to existing techniques using auto correlations, power spectra and spectrograms. Higher-order cumulants, as defined herein, enable the waveform analysis system to have access to waveform shape information that is typically unavailable when using prior art methods. Furthermore, the multidimensional cumulants defined by the present disclosure are insensitive to signal power.

It is an object of the disclosed subject matter to present a novel method for obtaining the "3-D fingerprint" of a received waveform. The method includes sampling the received waveform to obtain samples of an attribute of the received waveform; and estimating a multidimensional higher-order nonzero-lag auto-cumulant of the received waveform attribute samples to obtain the fingerprint of the received waveform.

It is also an object of the disclosure to present a novel method for classifying a received waveform. The method includes sampling the received waveform to obtain a predetermined number of samples of an attribute of the received waveform; estimating a multidimensional higher-order nonzero-lag auto-cumulant of the received waveform attribute samples; and comparing the estimated auto-cumulant of the received waveform attribute samples with a multidimensional higher-order nonzero-lag auto-cumulant of a known waveform to thereby classify the received waveform.

It is further an object of the disclosure to present a novel method for characterizing a received waveform. The method includes sampling the received waveform to obtain a predetermined number of samples of an attribute of the received waveform; estimating a multidimensional higher-order nonzero-lag auto-cumulant of the received waveform attribute samples; and comparing the estimated auto-cumulant of the received waveform attribute samples with a multidimensional higher-order nonzero-lag auto-cumulant of a known waveform to thereby characterize the received waveform.

It is another object of the disclosure to present a novel method for identifying a received waveform. The method includes sampling the received waveform to obtain a predetermined number of samples of an attribute of the received waveform; estimating a multidimensional higher-order nonzero-lag auto-cumulant of the received waveform attribute samples; and comparing the estimated auto-cumulant of the received waveform attribute samples with a multidimensional higher-order nonzero-lag auto-cumulant of a known waveform to thereby identify the received waveform.

Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION

The present subject matter uses waveform multidimensional higher-order cumulant "fingerprinting" features to provide additional waveform information such as modulation type and emitter characteristics.

Cumulants are certain $1^{st}$, $2^{nd}$, and higher-order statistics ("HOS") which are used to characterized the distribution of random variables. The mean and covariance are $1^{st}$ and $2^{nd}$ order cumulants. Higher-order cumulants can measure the departure of a random process from a Gaussian random process. For purposes of this disclosure, higher-order cumulants are $3^{rd}$-order and greater auto-cumulants. As used herein, the term "auto-cumulant" defines the cumulant operation on a single process (much like autocorrelation in low dimensional statistics) at some set of lag choices. The lag is the amount of offset of signal samples. For example, a sequence of waveform measurements 1–1000 with a lag=1 will compare samples 1–999 to samples 2–1000; a lag=2 will compare samples 1–998 to samples 3–1000; etc. Higher-order cumulants are uniquely suited for emitter classification because a cumulant of order >2 of any Gaussian random process is zero, and the set of random processes with identical higher-order cumulants is much smaller than the set of processes with identical second-order statistics. The former property is generally true for high-order cumulant approaches and is of utility for application where the signals may be weaker than the additive Gaussian noise encountered in the signal reception process. The latter property is a general attribute of higher-order statistics. It is well known in the art that it is more difficult for two signals to have identical or highly similar multidimensional representations whereas it is relatively easy for two fundamentally different signals to have, say, similar power spectra (e.g., BPSK and QPSK modulations). The present subject matter goes further than a simple application of high-order statistical theory. Unlike prior art high-order approaches, the present subject matter exploits the full complex 3-D volume available to the analysis system. In addition, the unique definition of the cumulant used by the present subject matter is well suited to array-based collection and exploitation of signals as well as yielding a measurement of signal features that is independent of the signal power. Independence of signal discrimination features from signal power is quite useful in many applications, and is not a property found in prior art signal analysis systems.

Figure 2A:
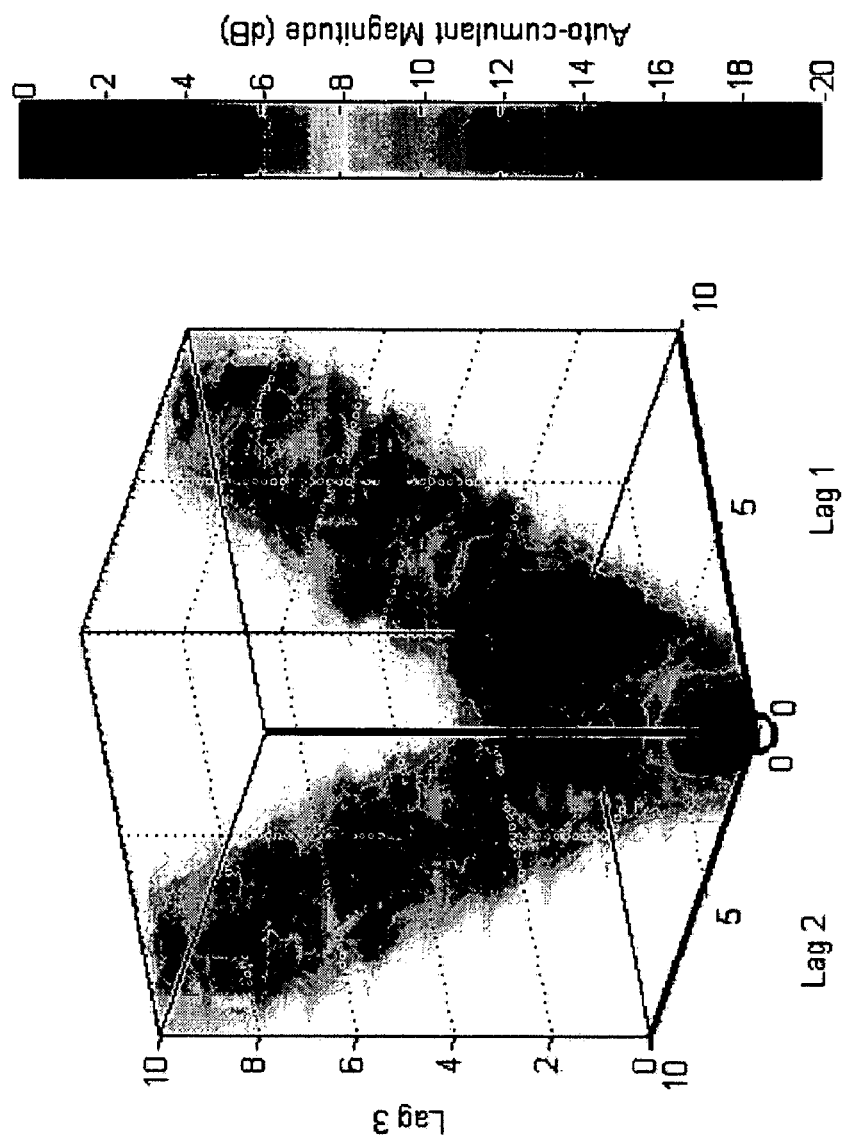
FIG. 2a is a representation of three-dimensional $4^{th}$-order cumulant features for lags from 0 to 10 for a BPSK waveform.
Figure 2B:
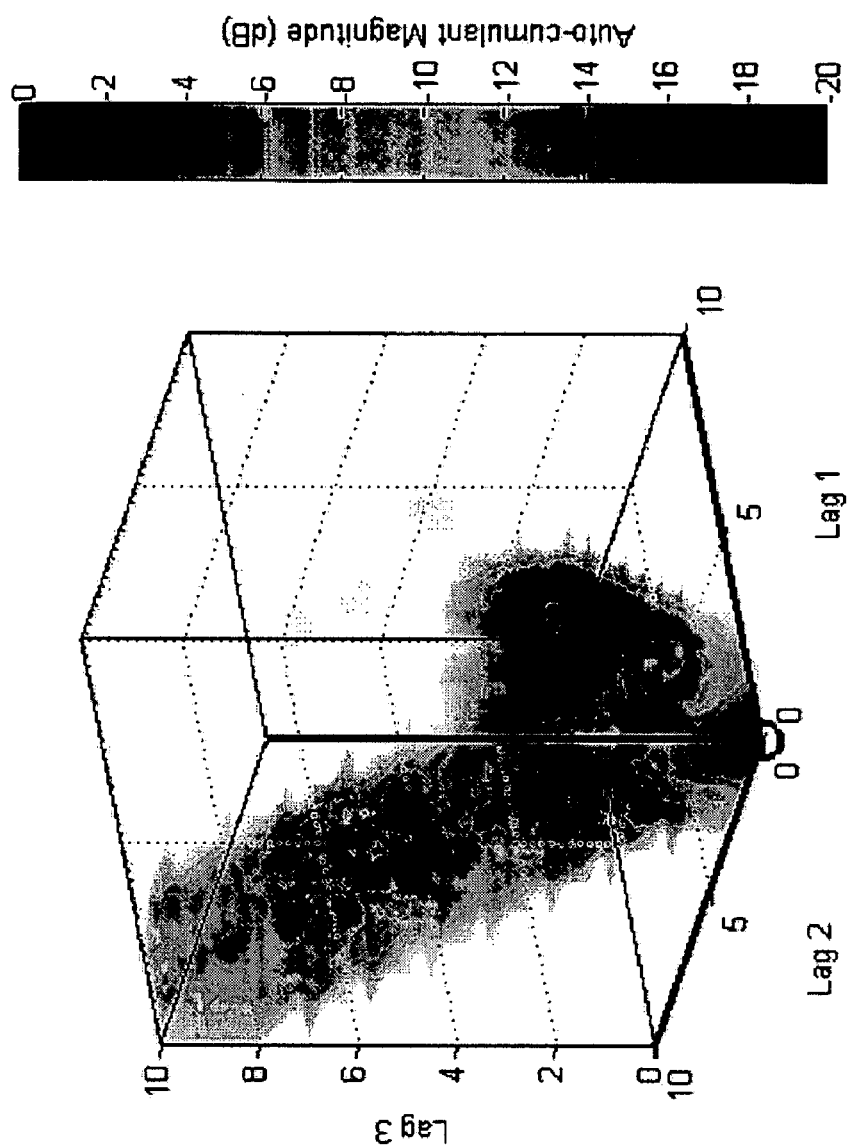
FIG. 2b is a representation of three-dimensional $4^{th}$-order cumulant features for lags from 0 to 10 for a 8PSK waveform.
Figure 2C:
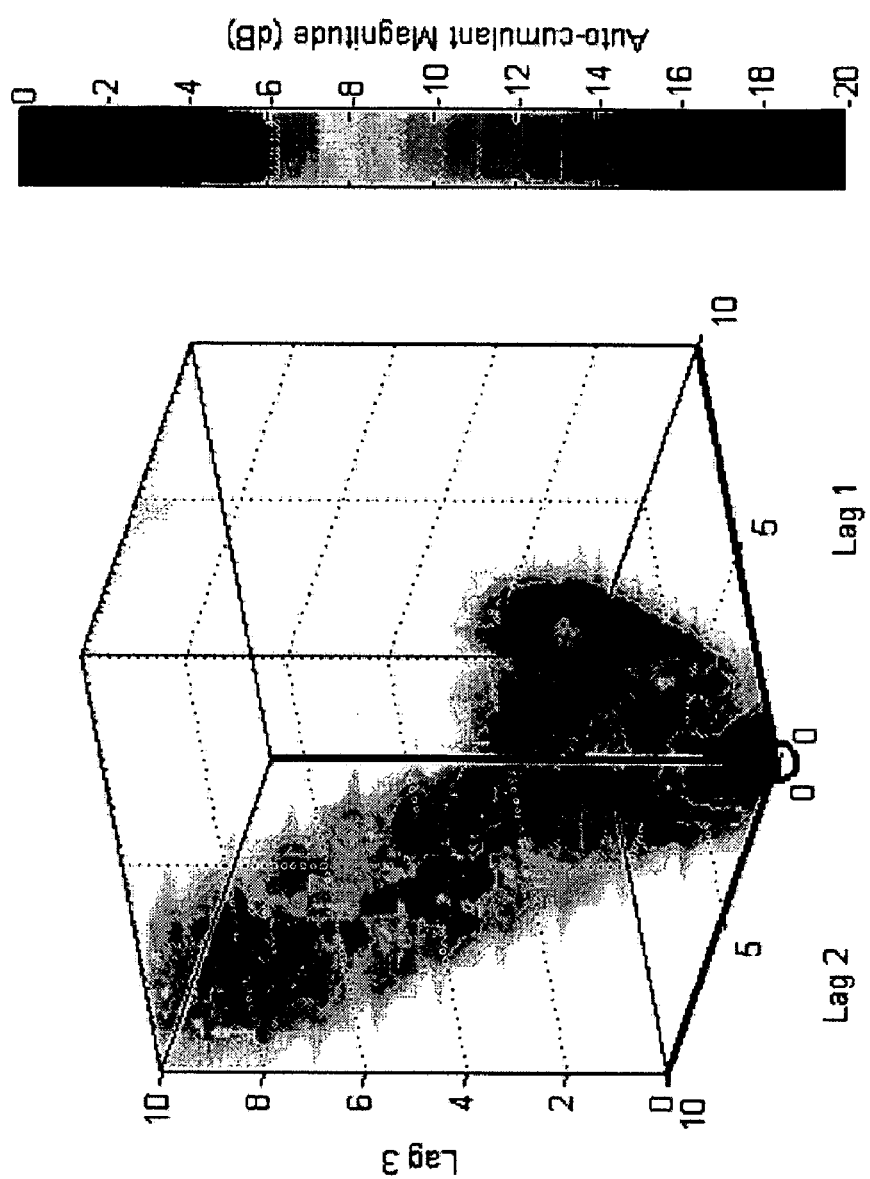
FIG. 2c is a representation of three-dimensional $4^{th}$-order cumulant features for lags from 0 to 10 for a QPSK waveform.
Figure 2D:
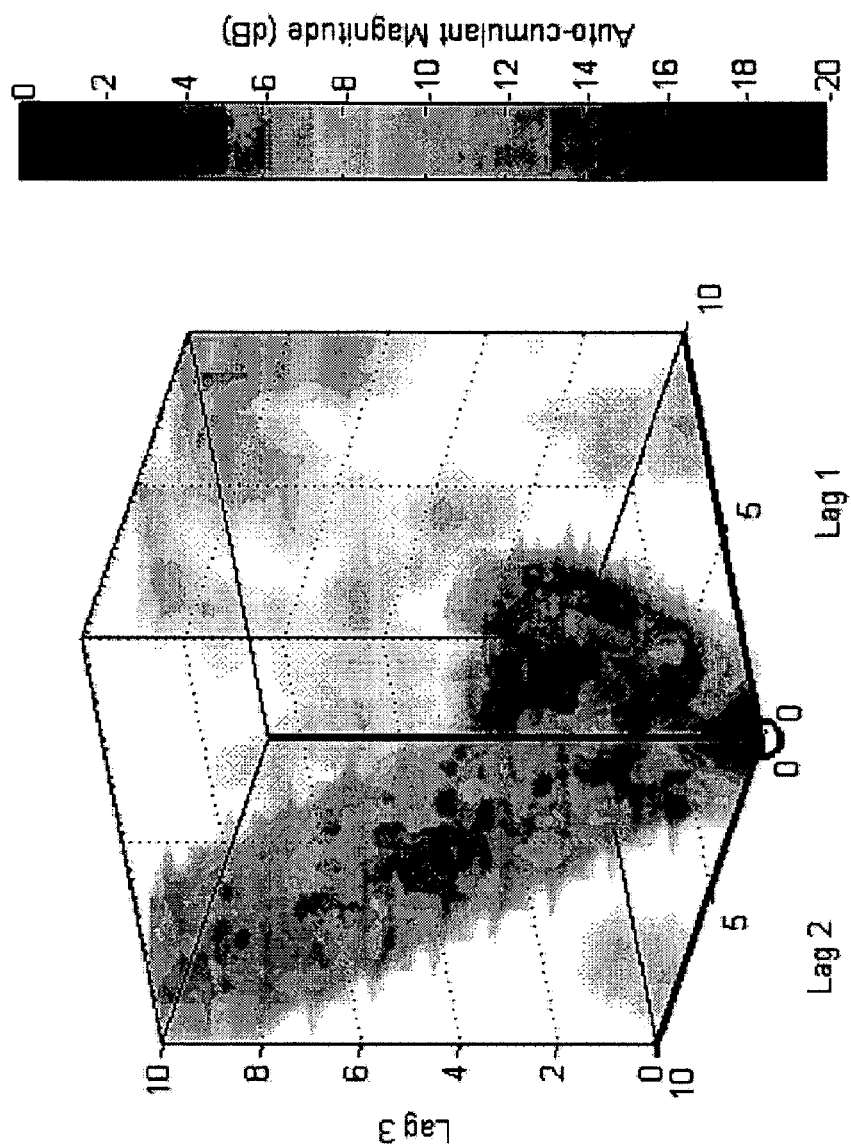
FIG. 2d is a representation of three-dimensional $4^{th}$-order cumulant features for lags from 0 to 10 for a 16-QAM waveform.

The $4^{th}$-order auto-cumulants of BPSK, QPSK, GMSK, QAM, DBPSK, MFSK, FSK, and DQPSK are easily distinguishable and thus do not suffer from the deficiencies in the prior art. The present subject matter uses multidimensional $4^{th}$-order cumulant features to determine an unknown emitter's waveform modulation type(s), e.g., BPSK, QPSK, 8PSK, 16-QAM, 64-QAM, 256-QAM as well as others. An example of the distinction between emitters' waveform modulation type is shown in FIGS. 2A through 2D. FIGS. 2A through 2D illustrate the 3-D $4^{th}$-order cumulant features for lags from 0 to 10 for BPSK (FIG. 2A), 8PSK (FIG. 2B), QPSK (FIG. 2C), and 16-QAM (FIG. 2D). By comparing FIGS. 2A through 2D, it is apparent that the 3-D $4^{th}$-order cumulants for the different modulation types are distinguishable and, therefore, useful for providing information to be exploited for classification and characterization of the respective emitters.

Even beyond identifying differences between modulations, the cumulant definition used in the present subject matter can also differentiate between instances of the same modulation type based on peculiarities inherent to a transmission system, e.g., phase noise, pulse shape differences, jitter, etc.).

As mentioned above, it is unlikely that two different emitters would have exactly, or substantially the same, fourth-order cumulant representation, even if the different emitters are using the same base waveform. This is because any deviation from nominal waveform implementation (e.g., frequency change, waveform change, phase noise, I/Q imbalance, timing jitter, phase jitter, symbol rate change, pulse shape change, a fourth-order statistic change, relative rotational alignment of a signal constellation change, power amplifier rise/fall time change, and Doppler shift change) causes the multidimensional fourth-order statistics of these signals to differ in a distinguishable manner. These differences are used to characterize the waveform and, more specifically, the emitter. To derive the cumulant information we use the mathematical constructs given below.

A mathematical element of the disclosed subject matter is the use of multidimensional spatial higher-order statistics to separate, characterize, and classify signal sources, such as a blind source separation algorithm that utilizes a normalized spatial fourth-order cumulant matrix pencil and its generalized eigenvalue decomposition (GEVD).

Figure 3:
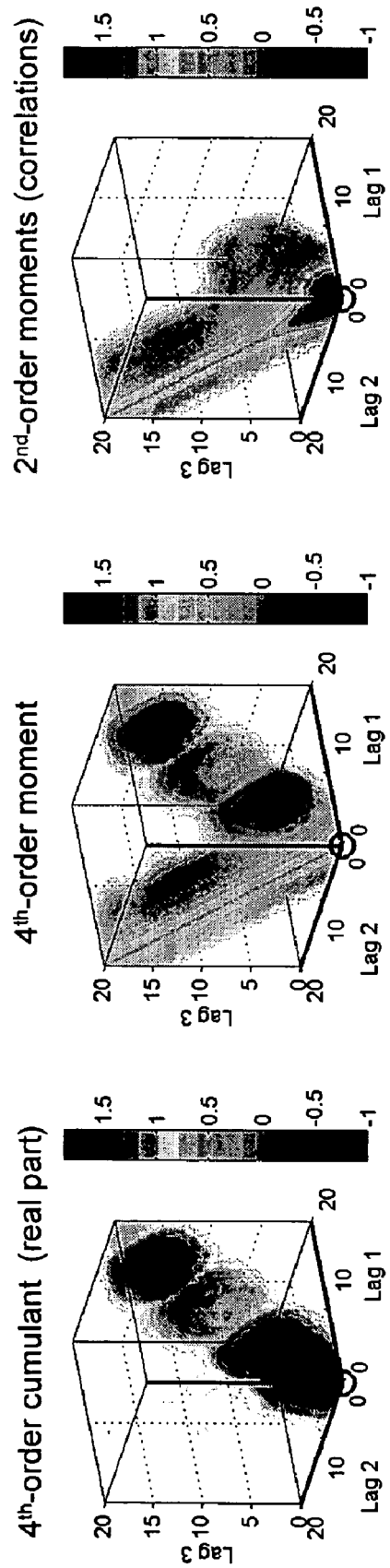
FIG. 3 is a representation of the components of a $4^{th}$-order nonzero lag auto cumulant.

Given a stationary, zero-mean complex random process, denoted as "r" measured at some relative time offset $\tau_j$ where j=1, 2, 3, the $4^{th}$-order auto-cumulant of r is a complex scalar function of lags ($\tau_1$, $\tau_2$, $\tau_3$):

$$cum[r, r_{\tau_1}^*, r_{\tau_2}, r_{\tau_3}^*] = E[rr_{\tau_1}^* r_{\tau_2} r_{\tau_3}^*] - E[rr_{\tau_1}^*]E[r_{\tau_2}r_{\tau_3}^*] - E[rr_{\tau_2}]E[r_{\tau_1}^* r_{\tau_3}^*] - E[rr_{\tau_3}^*]E[r_{\tau_1}^* r_{\tau_2}]$$

Where $E[rr_{\tau_1}^* r_{\tau_2} r_{\tau_3}^*]$ is the $4^{th}$-order moment, $E[rr_{\tau_1}^*]$ $E[r_{96\ 2} r_{\tau_3}^*] - E[rr_{\tau_2}]E[r_{\tau_1}^* r_{\tau_3}^*] - E[rr_{\tau_3}^*]E[r_{\tau_1}^* r]$ is the $2^{nd}$-order moments (correlations). FIG. 3 shows an illustration of the $4^{th}$-order cumulant, $4^{th}$-order moment and $2^{nd}$ order moments. Normalizing by the zero-lag auto-cumulant gives a $4^{th}$-order statistic that is independent of the signal power but still retains modulation shape information necessary for classification as shown below:

$$\frac{cum[r(t)\,r^*(t-\tau_1)\,r(t-\tau_2)\,r^*(t-\tau_3)]}{cum[r(t)\,r^*(t)\,r(t)\,r^*(t)]} = \frac{cum[m(t)\,m^*(t-\tau_1)\,m(t-\tau_2)\,m^*(t-\tau_3)]}{cum[m(t)\,m^*(t)\,m(t)\,m^*(t)]}$$

where $r(t) = \sqrt{Pm(t)}$.

The equations presented herein use the following subscripting convention. Quantities relating to the array observations available to the system are denoted with a boldface subscript x. However, the subscript should not be confused with the representation of the vector observation from the array output, also denoted as a boldface x. From the context the meanings shall be clear to those of skill in the art. Further, quantities relating to the propagating signals impinging on a receive array are denoted with a boldface subscript r. Following this convention, the matrix pencil of the array output data is given as is given as equation 1. An assumption is made that the received signals r comprising the vector observation of the array output x are independent. Therefore the spatial fourth-order cumulant matrix pencil (SFOCMP) of the array output $P_x$ can be written as:

$$P_x(\lambda, \tau) = C_x^4(0,0,0) - \lambda C_x^4(\tau_1, \tau_2, \tau_3) \quad (1)$$

where the arguments of the pencil $P_x$ represent a generalized eigenvalue, $\lambda$, and a triplet of time delays, $\tau$. The theoretical set of finite generalized eigenvalues turns out to be the inverse of the normalized fourth-order autocumulants of the M signals, $\{r_i(t)\}_{i=1}^{M}$ in the field of view (FOV) during the observation interval. The terms $C_x^4$ represent the spatial fourth-order autocumulant matrices. The arguments of the terms indicate the triplet of time delays used to form the matrices. The explicit computation is given as $$[C_x^4(\tau_1, \tau_2, \tau_3)]_{rc} \equiv \sum_{i=1}^{N} Cum[x_i^*(t-\tau_1), x_i(t-\tau_2), x_r(t), x_c^*(t-\tau_3)] \quad (1a)$$

where the matrix is N×N, and the subscript rc indicates the element in the $r^{th}$ row and the $c^{th}$ column. The subscript on the function x in the argument on the right-hand side, indicates which array port, i,r,c=1, 2 . . . ,N, is being used where N is the number of array ports available to the analysis system. Equation (1a) represents the complex data at the triplet lag ($\tau_1$, $\tau_2$, $\tau_3$) in the 3-D $4^{th}$-order cumulant domain. The collection of these complex values provides the discrimination statistic for the present subject matter. In the present subject matter, if N is limited to unity then the signal classification system cannot use any spatial degrees of freedom to separate multiple time-coincident signals. However, the utility of the signal classifier is not diminished. The classifier used with the present subject matter assumes that a signal is available in "isolation". For applications where the user wishes to classify a collection of signals that are time-coincident, an array-based receiving system is necessary, i.e., N>1 and must be at least equal to the maximum number of time-coincident signals expected. In this case, a signal separation is a preprocessing step in the classifier processing. It is of interest that the cumulants useful for defining separation vectors also provide the information for classification/discrimination.

In the case where spatial location is to be included as part of the emitter identification or waveform characterization process, for example because the signals of interest are collected simultaneously with other signals, the blind source separation technique described in co-pending and commonly-assigned U.S. patent application Ser. No. 10/360,631, incorporated by reference as mentioned above, may be employed. For completeness, a brief description is provided below. Because of the unique definition of $4^{th}$-order cumulants as used herein and described above, the cumulant matrix pencil of the array output data $P_x$ is related to the cumulant matrix pencil of the impinging signals $P_r$ as given below in equation 2

$$P_x(\lambda, \tau) = C_x^4(0, 0, 0) - \lambda C_x^4(\tau_1, \tau_2, \tau_3) \quad (2)$$
$$= V[C_r^4(0, 0, 0) - \lambda C_r^4(\tau_1, \tau_2, \tau_3)]V^H$$
$$= V P_r(\lambda, \tau) V^H$$

The quantity V shown in equation 2 is a $N \times M_s$ matrix composed of the steering vectors for each signal impinging on the array, where N is the number of array ports available to the user and $M_s$, $M_s \leq N$, is the number of signals. In a very simplistic and idealized case the well-known array propagation vector is a steering vector (i.e., the time delay is represented as phase). However, in general if the array is well-designed (i.e., no grating lobes) and the signals are emitted from non-identical locations, then the matrix V is of full rank. This guarantees an equivalence between the eigen structure of the pencils $P_r$ and $P_x$. For the present subject matter, the cumulants potentially useful for signal separation may be used as elements of the feature vectors used for discrimination/classification. However, for discrimination/classification, a 3-D volume must be computed, i.e., at a multiplicity of lag triplets, and not just a set of N eigenvalues for a given lag triplet.

Since $P_r$ is a pencil solely of the received signals, and the signals are assumed independent, then by virtue of the properties of cumulants, the pencil $P_r$ is diagonal. This property does not hold true for the pencil formed with the array output data x. However, because an "equivalence" property holds, given mild conditions on V, the finite eigenvalues of $P_x$ are the finite eigenvalues of $P_r$. This provides access to the exploitable $4^{th}$-order cumulant properties, i.e., the eigenvalues, of the individual signals measured by the N-element array. As introduced here the eigenvalues of the pencil $P_x$ represent the fourth-order characteristics of each received signal. The value of these eigenvalues is that they are precisely the eigenvalues needed for classification and discrimination. As shown below, these eigenvalues are defined by the special form of the $4^{th}$-order cumulants as defined in the present subject matter. The eigenvalues are implicit characteristics of the emitter's signal and the eigenvalues are exploited for 3-D fingerprinting the emitter by computing the eigenstructure at a plurality of lag triplets.

Specifically, for each lag triplet, each signal in $\{r_i(t)\}_{i=1}^M$ contributes one finite eigenvalue, and it is expressed as the inverse normalized fourth-order auto-cumulant for that signal as expressed by equation 3.

$$\lambda_m = \frac{c_{r_m}^4(0, 0, 0)}{c_{r_m}^4(\tau_1, \tau_2, \tau_3)} \quad \text{for } m = 1, 2, \ldots, M \quad (3)$$

where the terms $c_{r_m}^4$ represent the individual fourth-order cumulant terms for each signal. These terms are actually the diagonal terms of the pencil $P_r$ as shown in equation (4).

$$P_r(\lambda, \tau) = \begin{bmatrix} c_{r_1}^4(0,0,0) - \lambda c_{r_1}^4(\tau_1, \tau_2, \tau_3) & 0 & \ldots & \ldots & 0 \\ 0 & \ddots & & & \vdots \\ \vdots & & c_{r_j}^4(0,0,0) - \lambda c_{r_j}^4(\tau_1, \tau_2, \tau_3) & & \\ \vdots & & & \ddots & \vdots \\ 0 & \ldots & \ldots & & c_{r_M}^4(0,0,0) - \lambda c_{r_M}^4(\tau_1, \tau_2, \tau_3) \end{bmatrix}$$

Thus the GEVD of the two pencils $P_x$ and $P_r$ have the same set of finite solutions for the eigenvalues. The eigenvalues are the terms where the rank of the pencil is reduced. It should be readily apparent that values given by equation (3) are the eigenvalues of the pencil equation (1).

These eigenvalues are available to a signal analysis/recognition system. The eigenvalues are implicit characteristics of the emitters signals. This property is exploited in fingerprinting the emitter.

Figure 4:
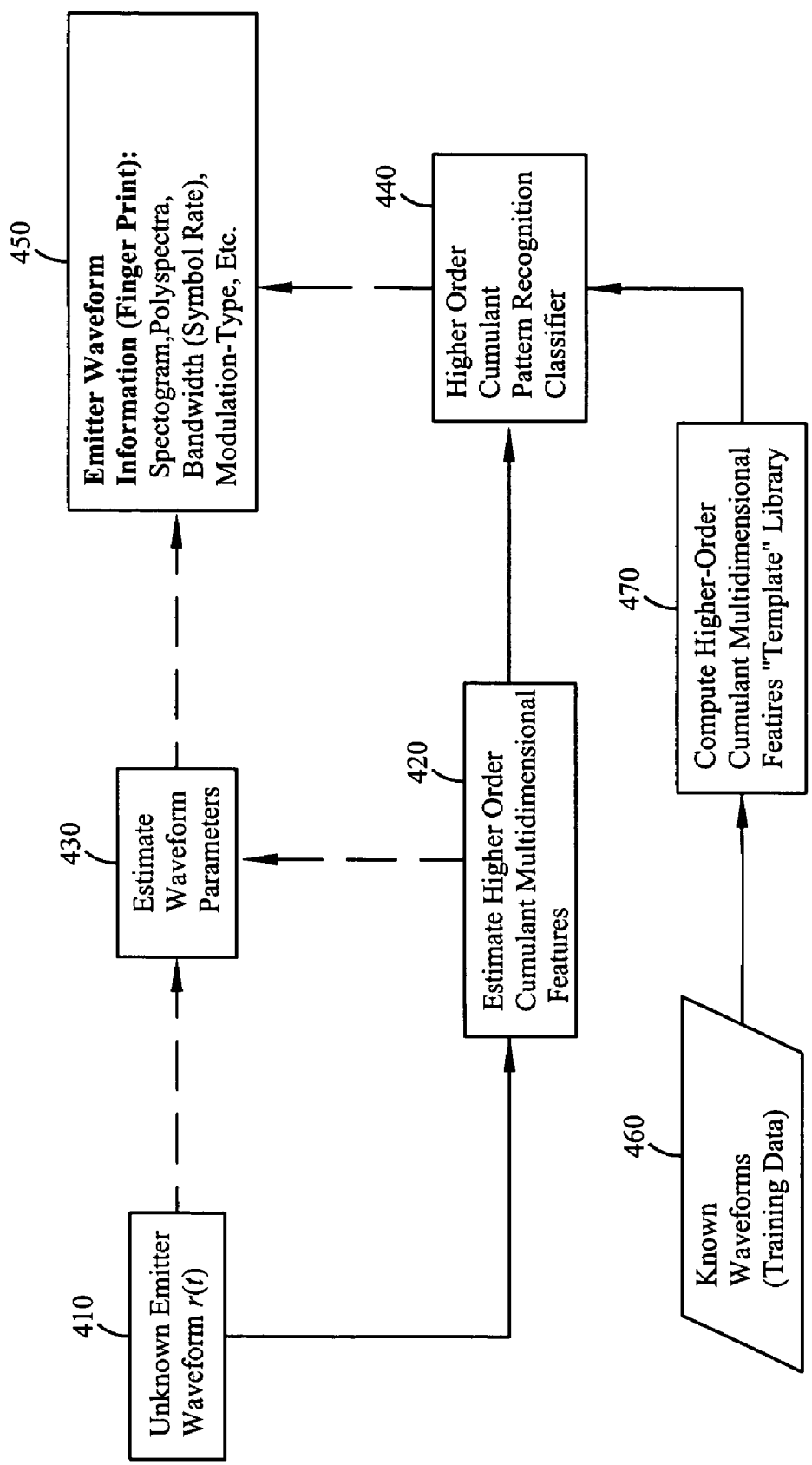
FIG. 4 is a representation of an embodiment of a $4^{th}$-order cumulant classifier and characterizer.

An embodiment of the subject matter for classifying and characterizing an unknown signal r using the characteristics and properties described above is illustrated in FIG. 4. The unknown emitter waveform 410 is received and an estimate of the higher order cumulant features are determined as represented in block 420. The receiver using the emitter waveform and the estimate of the higher order cumulant multi dimension features, estimates waveform parameter such as spectrogram, polyspectra and bandwidth characteristics as represented in block 430.

The estimate of the higher-order cumulant multidimensional features are used by the pattern recognition classifier to classify the unknown emitter waveform as shown in block 440.

The pattern recognition classifier 440 compares the estimated features to a library of features associated with known waveforms to determining the classification of the waveform. The higher-order cumulant multidimensional features library 470 is formed from the higher-order cumulant multidimensional features of known waveforms in a database 460. The representative waveforms samples selected from the database are idealized (or nominal) waveforms without anomalous variations, i.e., the waveforms are typical representatives of a signal class, such that the waveforms of a modulation type have a $4^{th}$-order auto cumulant in part descriptive of all waveforms of the same modulation type. These waveform samples are used as templates for 3-D pattern matching the fingerprints computed for each received unknown emitter waveform. The classifier uses the waveform parameters estimated, i.e., the fingerprints, and the database templates to determine the optimal match and report the waveform classification. Many matching criteria are possible and one embodiment of the present disclosure uses a total least squares metric over the 3-D volume comprising the fingerprint. The information from the classification and characterization can be used to assist interception and exploitation of the emitter signal or to jam the signal.

The classification and characterization information of the signal is stored in a detected signal database (not shown) and can be used to augment the known waveform database if the classification confidence is high and the data is known or assumed to be free of anomalous variations. This type of classification adaptively augments the signal database without requiring an a priori complete list for identification. Further, the inclusion of spatial location of an emitter in the detected signal database can aid in future identification of the emitter where an unambiguous fingerprint is not generated.

Thus, it is useful to allow the detected signal database to include the location of the detected emitter(s) which can be used to identify the emitter along with the fingerprint of the emitter signal. Future detection of an emitter's signal can also be positively identified using the stored properties of a previously measured emitter. Thus by template matching one need not have a positive identification (e.g., the name for the emitter). Merely recognizing another instance of a previously measured signal/emitter can be of great value, for instance for tracking movement of an RF radiating object. Thus the subject matter of the current disclosure can not only classify the emitter type (or modulation type), but can also determine whether the signal belongs to a particular unique emitter (identification). This information is especially useful in military application for obvious reasons. The detected signal database and known waveform database 360 can take the form of a look-up table indexed by the multidimensional features and/or other waveform parameters.

Figure 1:
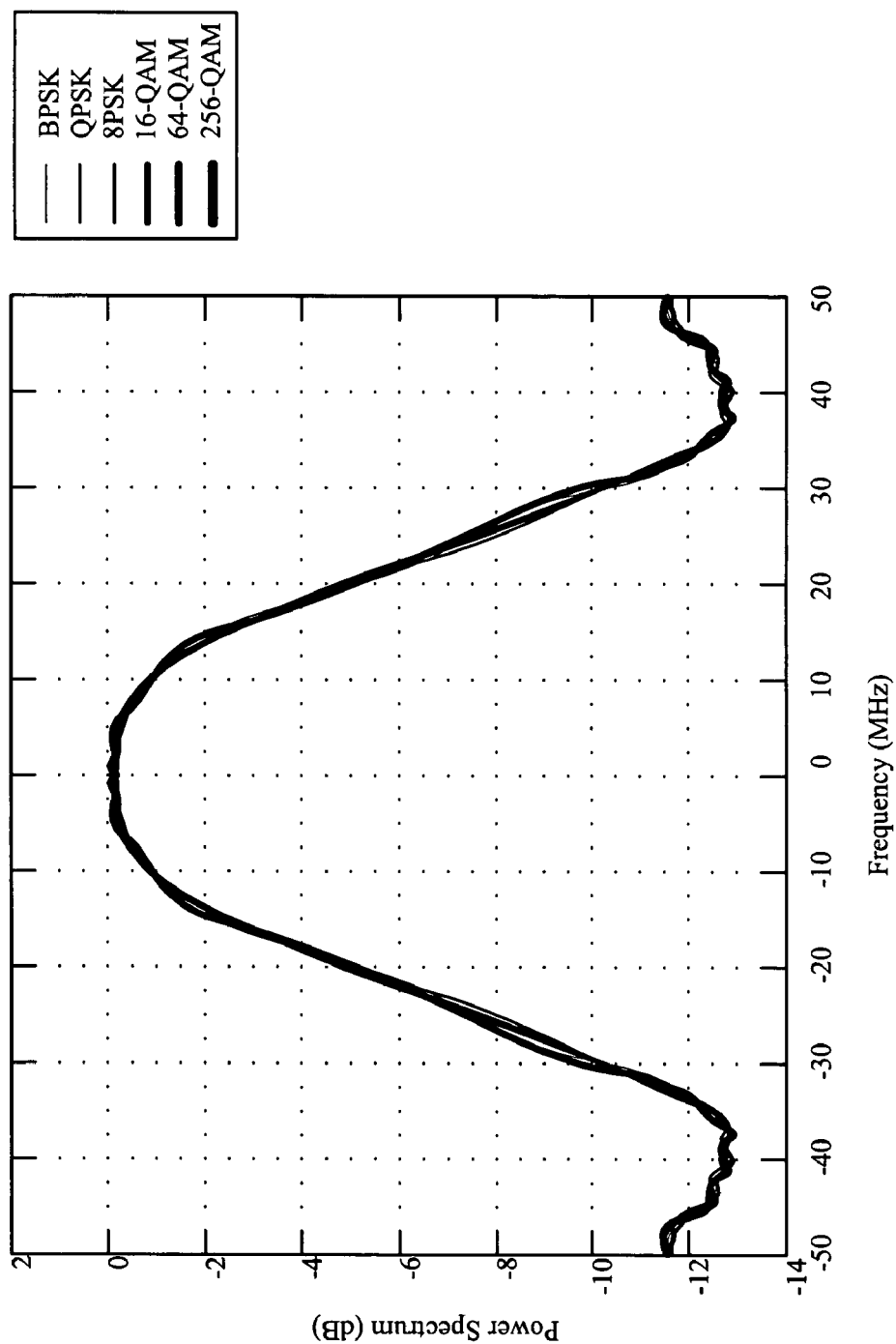
FIG. 1 is a representation of the power spectral densities for PSK/QAM waveform.

Chart 1 shows the result of Monte Carlo simulation results over 100 trials for each modulation type shown in FIG. 1. As seen in Chart 1 the multidimensional $4^{th}$-order cumulant classifier achieves error-free recognition between QAM and PSK modulations and between different M-ary PSK.

CHART 1

$4^{th}$-ORDER CUMULANT CLASSIFIER OUTPUT

| TRUE WAVEFORMS | BPSK | QPSK | 8PSK | 16-QAM | 64-QAM | 256 QAM |
|---|---|---|---|---|---|---|
| BPSK | 100 | 0 | 0 | 0 | 0 | 0 |
| QPSK | 0 | 100 | 0 | 0 | 0 | 0 |
| 8PSK | 0 | 0 | 100 | 0 | 0 | 0 |
| 16-QAM | 0 | 0 | 0 | 74 | 11 | 13 |
| 64-QAM | 0 | 0 | 0 | 48 | 23 | 29 |
| 64-QAM | 0 | 0 | 0 | 39 | 27 | 34 |

It is again important to notice that any deviations from a nominal waveform type, such as a QPSK waveform without phase noise or timing or I/Q imbalance, will cause a detectable shift in a signal's fourth-order statistic, this property is exploited to characterize the waveform.

Figure 5:
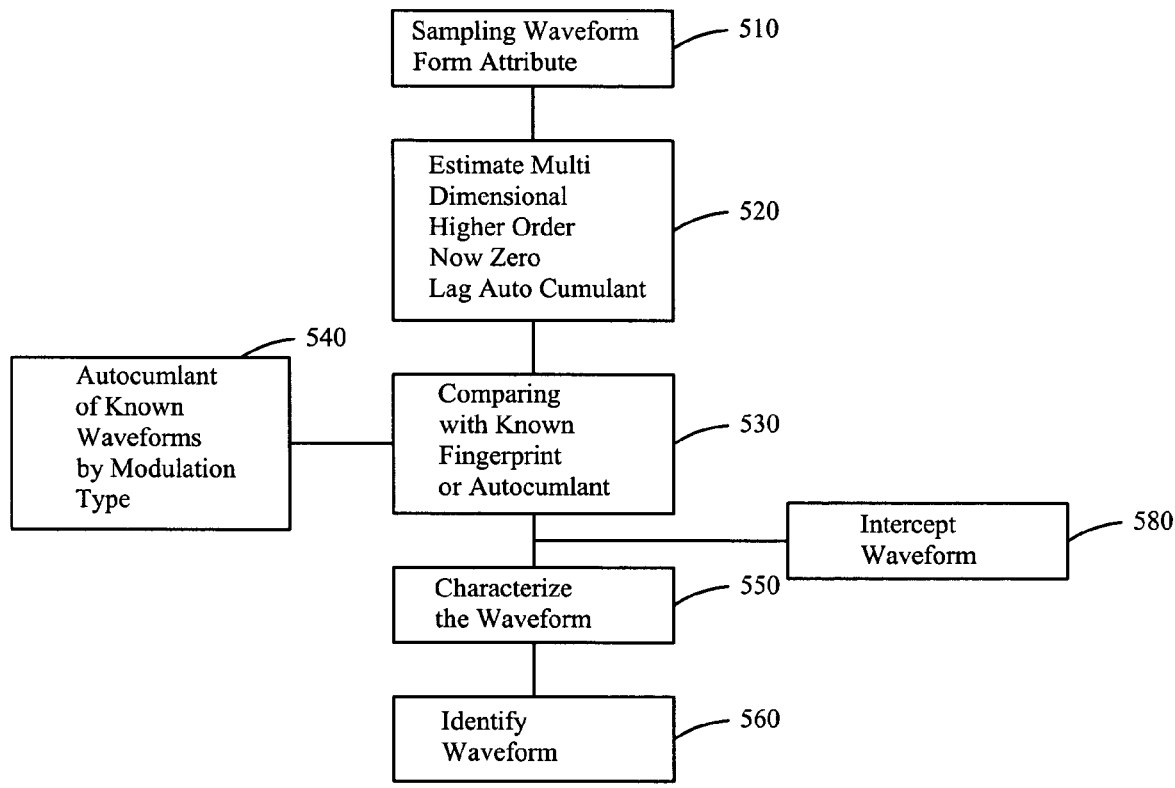
FIG. 5 is a representation of a method for classifying a received waveform.

FIG. 5 shows a generalized flow chart of an embodiment of the present subject matter utilizing $4^{th}$-order auto-cumulant multidimensional features to classify, characterize, fingerprint, identify and exploit a received signal. The subject matter of the present disclosure samples the received waveform to thereby obtain a number of samples of an attribute of the received waveform, as indicated in block 510. The particular attribute may be a random process including but not limited to the phase, frequency, amplitude, power spectral density, symbol rate, symbol energy, bandwidth, modulation, phase jitter, timing jitter, signal constellation, pulse shape and frequency offset of the signal. The received signal is sampled by an antenna array which can be located at a fixed location or on a mobile platform such as a aircraft, ship or ground vehicle. A signal of interest is often received with signals from other emitters and as necessary undergoes a separation algorithm, one of which is described in detail in "Blind Source Separation Utilizing A Spatial Fourth Order Cumulant Matrix Pencil" which has been previously incorporated by reference, to isolate the particular received signal.

An estimate of the multidimensional higher-order non-zero-lag auto-cumulant of the received waveform representing the finger print of the signal's attribute is created in Block 520. These multidimensional features (fingerprints) are used to classify the waveform modulation in block 530. In classifying the waveform modulation of the signal, the estimated auto-cumulant of the received waveform attribute samples are compared with a multidimensional higher-order nonzero lag auto-cumulant of known nominal waveforms stored in a modulation type database 540, the modulation type database corresponding multidimensional features with their attendant modulation types. The waveform is then characterized in Block 550.

In block 550 the $4^{th}$ multidimensional features of the received waveforms are used to characterize the waveform. Block 560 identifies the waveform. Information can be extracted or intercepted by the used of the classification of the received waveform as shown in block 580.

Figure 6:
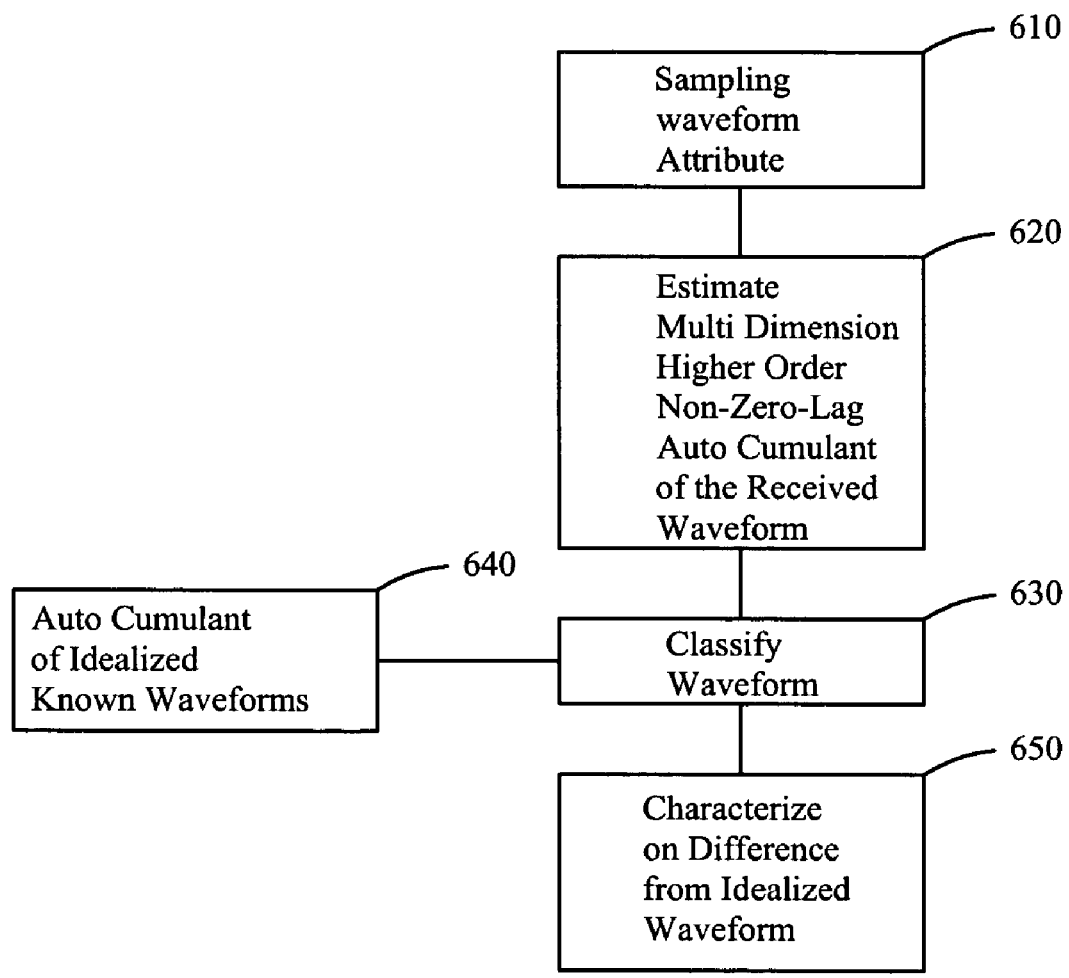
FIG. 6 is a representation of a method for characterizing a received waveform.

FIG. 6 is an illustration of an embodiment of a method for characterizing a received waveform. The received waveform is sampled in Block 610, an estimate of multidimensional $4^{th}$-order non zero lag auto-cumulant for a signal's attribute is generated in block 620 as previously described in reference to FIG. 5. The waveform is classified in Block 630 using the auto-cumulant of idealized known waveforms by modulation type as found in block 640. After the modulation type has been determined, the difference between the idealized (nominal) waveform and the auto-cumulant of the received waveforms are used to characterize the received waveform. The differences, representing particularities of the emitter transmitting the signal such as local oscillator phase jitter, non-linearity in the power amplifier and other variations imprinted on the signal as a result of the emitter. This information is also stored in the detected signal database or similar database. The characterization of the received waveform further describes the signal beyond the modulation type.

Figure 7:
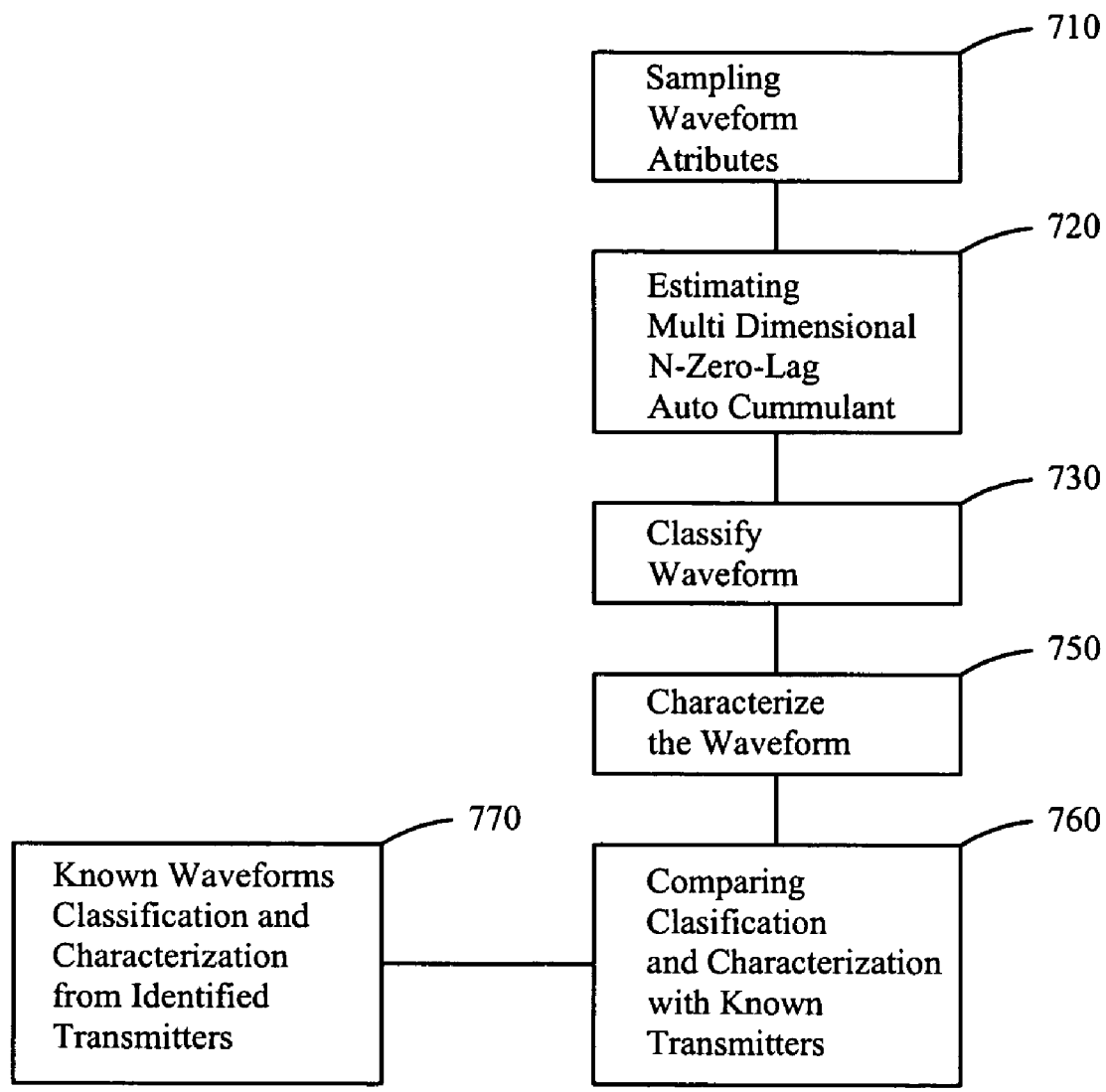
FIG. 7 is a representation of a method for identifying a received waveform.

FIG. 7 is an illustration of an embodiment of a method for identifying the emitter from which the waveform was transmitted. The received signal is sampled in block 710 and an estimate of multidimensional non-zero lag auto-cumulant of an attribute of the received waveform is determined in block 720. The waveform is classified by modulation type in block 730 and characterized in block 750. Characteristics as determined by the characterization process are used to compare the received waveform with the characteristics of known (previously detected) waveforms from known emitters from the detected signal database. The detected signal database can include modulation type, characteristics, and additionally location. Using this comparison, the emitter from which the waveform is transmitted can be identified if a match or close associated is found. If no association is found, the classification, characterization and location is stored with the detected signal database or similar database for future reference and identification. The waveforms in the detected signal database are actual signals and not idealized signals as contained in the known waveform database used to classify and characterize the waveform.

Figure 8:
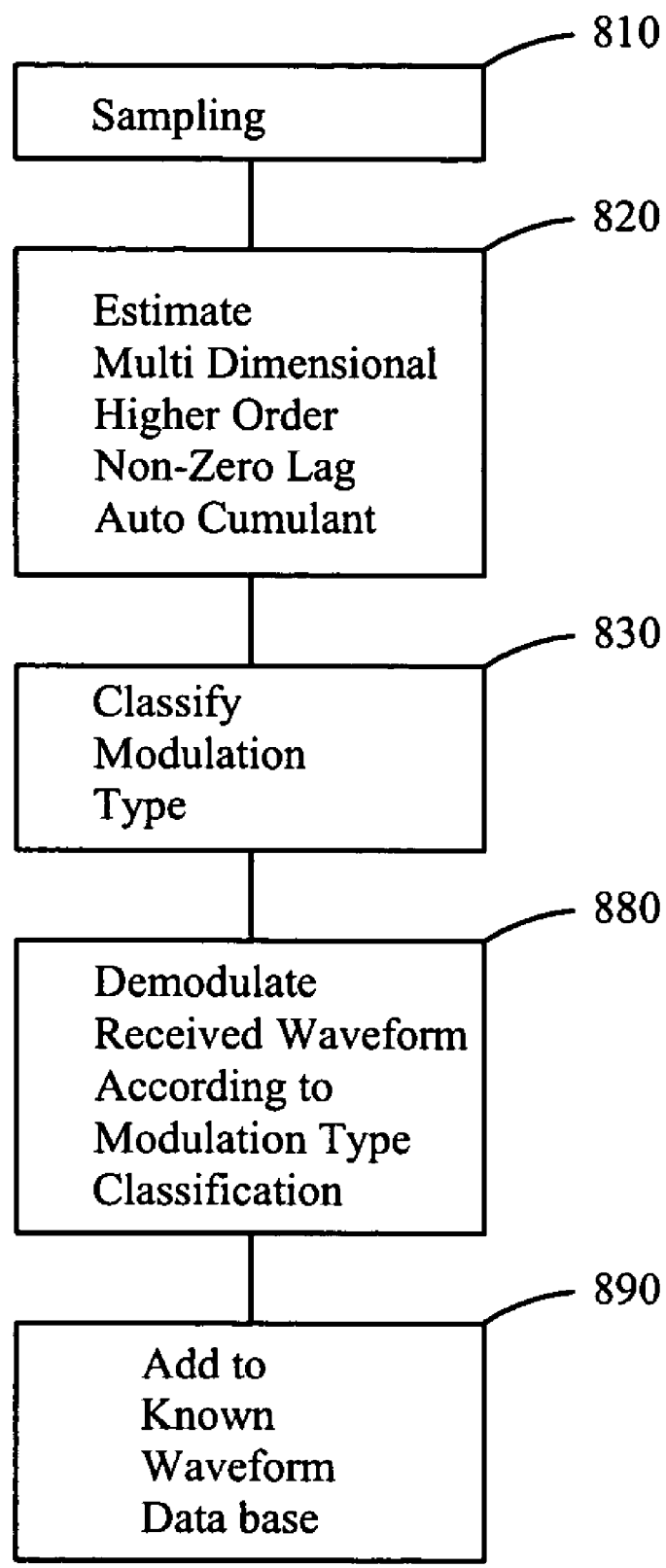
FIG. 8 is a representation of a method for intercepting a received waveform.

FIG. 8 is an illustration of a method for intercepting (exploiting) the information encoded on the received waveform. The received waveform is sampled in block 810, the multidimensional $4^{th}$-order non-zero lag auto cumulant of an attribute of the received waveform is estimated in Block 820. The waveform is classified in block 830. Using the classification of the waveform, the modulation type is determined and the waveform is demodulated accordingly to recover the information. The information can be used to categorize the waveform into further categories such as commercial, government, military or other categories, such as friend, foe or neutral. The information can also be linked to the detected signal database providing additional information useful in SIGINT operations.

Figure 10:
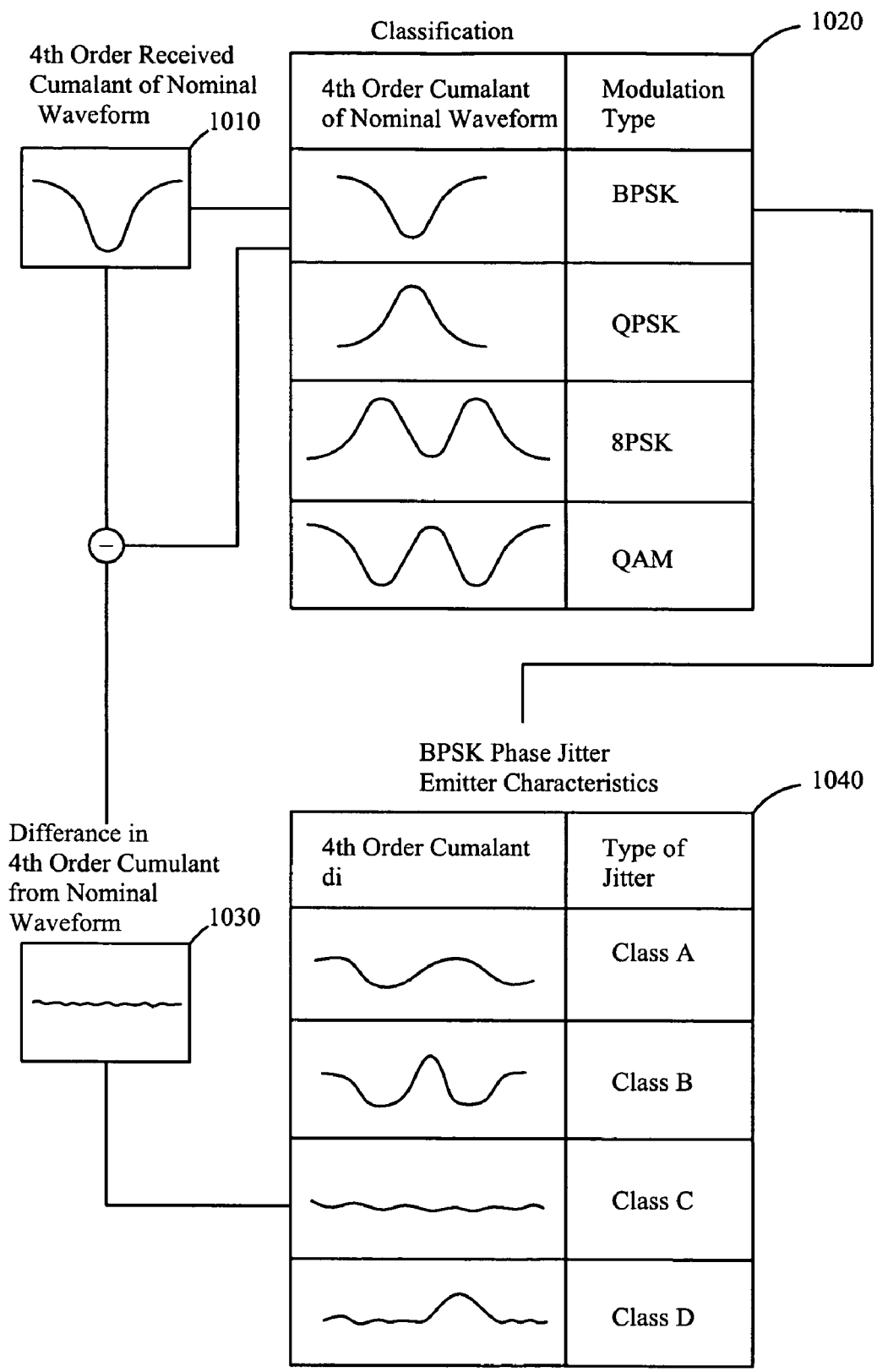
FIG. 10 is a representation of a method using look up tables in classifying and characterizing a received waveform.

The known signal database and the detected signal database can be implemented as a look-up table (LUT) or series of look-up tables. Additionally, both databases may be contained within one database of series of look up tables. An example of using look up tables to characterize and classify a received waveform is shown in FIG. 10. The example shown is merely illustrative. The $4^{th}$-order auto cumulant 1010 is estimated for the received waveform and compared with the $4^{th}$-order cumulant of the nominal waveform which is lined to the modulation type as shown the classification look up table 1020. As shown, the $4^{th}$-order auto cumulant matches BPSK modulation type. The classification LUT is used to connect the BPSK characterizing LUTs, only the phase jitter LUT is shown in FIG. 10 for clarity.

The deviation 1030 from the auto-cumulant of the nominal waveform and the received waveform is used in LUT 1040 to determine the characterization of the jitter for the waveform. As shown in FIG. 10 the difference is associated with a class C type jitter, the signal is classified as a BPSK with a class C jitter. The symbols used in FIG. 10 are for examples only, and are not meant to literally represent the $4^{th}$-order cumulant or deviation, and the cases of jitter are merely representative of different types of jitter and have no particular significance.

Figure 9:
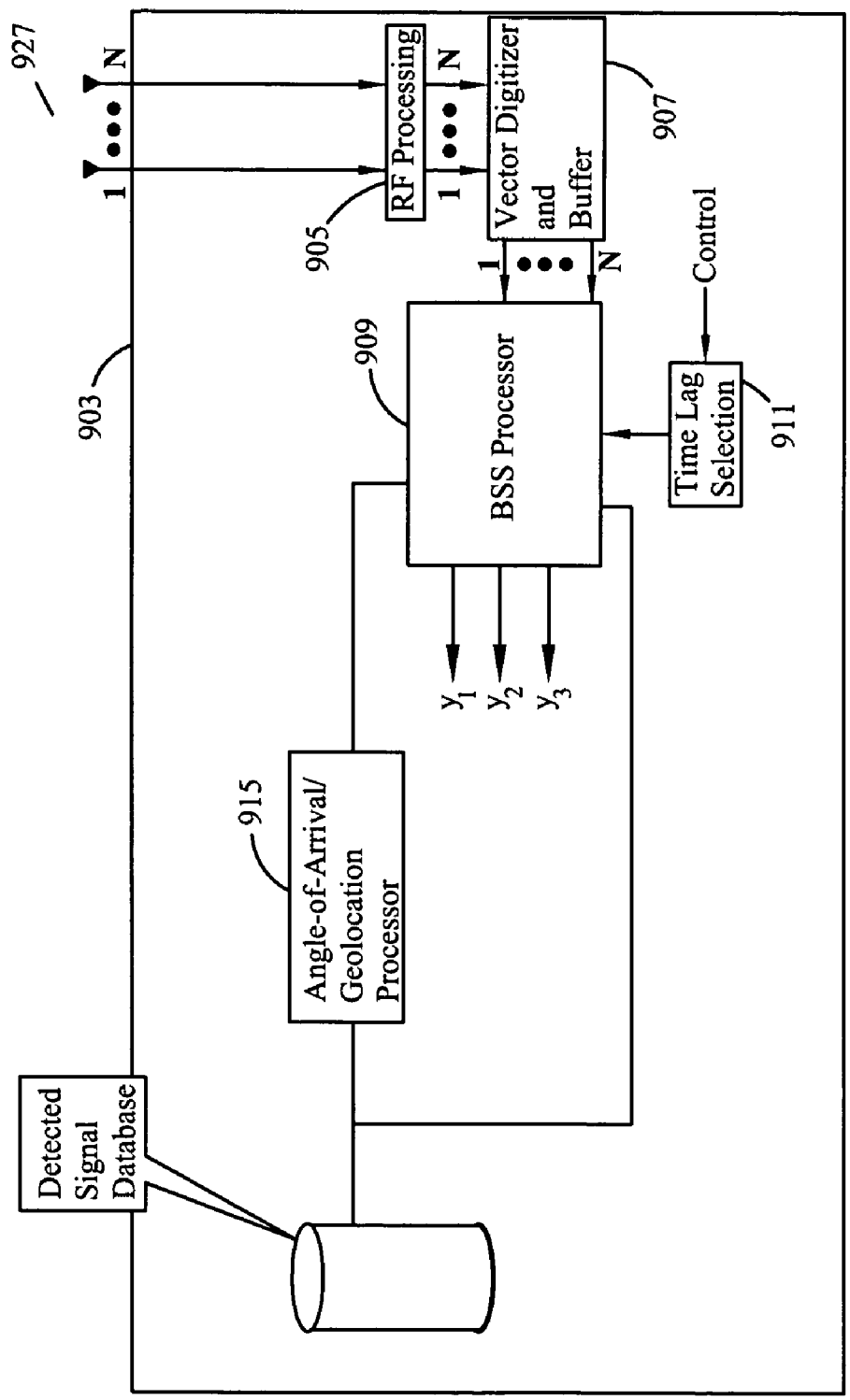
FIG. 9 is a representative schematic of a system for separating and obtaining samples of a received waveform.

FIG. 9 shows a possible implementation for obtaining sample of the signal where a receiver 903 uses an N-element (or port) receive array 927 and an RF processor 905 to obtain the transmitted signal from the unknown emitter. The array data is first sampled and digitized at some rate suitable for the application. Each array output is digitized simultaneously producing a vector observation in the vector digitizer and buffer 907. The array output data is buffered and subdivided into non-overlapping blocks in 907. Block-wise across signal samples (i.e. the vector observations) are then collected from an array at the intended receiver aperture and the cumulants are block estimated, the matrix pencil is formed, and the generalized eigenvalue decomposition (GEVD) is performed by a Blind Source Separation processor 909. The operation of the BSS requires the selection of a triplicate of nonzero time lags provided by the time lags selection device 911. When using a sequence of block estimates for the SFOCMP eigenvalues of the $M_s$ signals will be apparent. Spatial information regarding the location of the unknown emitter types are linked in a 1:1 fashion to the generalized eigenvalues produced by the processing in 909, which are also used to distinguish an emitter.

As may be apparent to those of skill in the art, there may be some advantage to overlapping blocks of the data. However, the following discussion deals with non-overlapping blocks. On each block, the two fourth-order spatial cumulant matrices required to form the SFOCMP are formed using pre-selected delay triplets. The delays can be either pre-selected, or subjected to online modification using a programmed search routine (if necessary). This search routine might be necessary when certain conditions, such as repeated eigenvalues for different signals are encountered. However, provisions are made for signals whose eigenstructure match at the delays selected to be repressed at different delays to provide improved discrimination if desirable. After the matrix pencil is formed, the GEVD is computed. From the GEVD, the eigenvalues and eigenvectors are used to determine the signal environment over time block b. As part of the storage procedure, the spatial location of the signal may be determined (i.e., either angle-of-arrival (AOA) or geolocation, whichever applies given the specific application) by the AOA/Geolocation processor 915. Additionally, the steering vector can be recorded, which is useful when refined spatial information is unavailable and the relative motion of the transmitter and receiver is negligible. All this data is formed and recorded in the detected signal database 917 along with other ancillary data that may be useful for signal fingerprinting.

Additionally as emitter location can be determined from the steering vector, the estimated location can also be used to describe the emitter.

The steering vectors can also be estimated from the cumulant data for each signal in the FOV of the receiver. A cumulant matrix formed by the receive data, say $C_x^4(0,0,0)$ and for each eigenvector available from the pencil $P_x$ forms, $$C_x^4(0,0,0)e_x^{(j)} = \left[\sum_{i=1}^M c_{r_i}(0,0,0)v_i v_i^H\right]e_x^{(j)} = \beta v_i$$

The last equality follows directly from the fact that each eigenvector of the SFOCMP $P_x$ is orthogonal to each signals steering vector, $v_i^H e_x^{(j)}=0$ when i≠j. This fact is generated by the unique construction of the SFOCMP and the definitions of the cumulants.

It is important to note that while spatial location is an added benefit it is not necessary to practice the disclosed subject matter. Spatial correlation can be broaden to include simply steering vectors. This is useful when the array and emitter have a stable geometry. Relative motion between the transmitter and sensing array causes the steering vectors to have a detrimental time dependency. Again, if the spatial variable for correlating the message data is "slowly" varying then small incremental changes can be tolerated.

Although access to the spatial variables using only the receive array output data has been previously described. It is useful to note a blind source separation algorithm based on a fourth-order cumulant matrix pencil produces eigenvectors that are orthogonal all but one signal's steering vector. Thus using the eigenvectors it is possible to estimate each corresponding signal's steering vector. Once steering vector estimates are available, the estimation of the other spatial variables, AoA and/or geolocation, can be determine by methods well-known in the art. The characteristic that allows this computation is that the eigenvalues and eigenvectors of the GEVD of the SFOCMP have a 1:1 correspondence as in standard eigenanalysis. So, when the eigenvalues are used to measure the high-order statistical properties of the received signals, an index relating directly to where that signal with that characteristic emanated from is available. Again, the spatial dimension for signal association can be exploited to remove any ambiguity of the temporal decomposition, since we assume that no two emitters are identically located.

The spatial location of any emitter is independent of the exact value of its corresponding eigenvalues available from the GEVD of the SFOCMP. Lastly, the spatial variables provide additional "distance" in the recovery process, since it is now multidimensional. For example, two signals may have very similar eigenvalues. But, if their spatial locations are resolvable by the receiver, and fairly constant, then the eigenvalues corresponding to those spatial locations can be easily assigned.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

We claim:

1. A method for obtaining the fingerprint of a received waveform comprising the steps of:
   (a) sampling the received waveform to thereby obtain a predetermined number of samples of an attribute of the received waveform; and
   (b) estimating a multidimensional higher-order nonzero-lag auto-cumulant of the received waveform attribute samples to thereby obtain the fingerprint of the received waveform.

2. The method of claim 1 wherein the attribute is a random process.

3. The method of claim 2 wherein the random process is stationary with statistical properties up to order N+1 that are invariant to shift in the origin over the sample observations for a fingerprint of dimension N.

4. The method of claim 2 wherein the random process is zero-mean.

5. The method of claim 2 wherein the attribute is selected from the group consisting of phase, frequency, amplitude, power spectral density, symbol rate, symbol energy, bandwidth, modulation, phase jitter, timing jitter, signal constellation, pulse shape and frequency offset.

6. The method of claim 1 wherein the auto-cumulant is a fourth order cumulant.

7. The method of claim 1 wherein the auto-cumulant is determined as a function of three lags.

8. The method of claim 1 wherein the fingerprint is used to classify the received waveform.

9. The method of claim 1 wherein the fingerprint is used to characterize the received waveform.

10. The method of claim 1 wherein the fingerprint is used to identify the received waveform.

11. The method of claim 1 wherein the fingerprint is used to intercept the received waveform.

12. The method of claim 1 further comprising the steps of:
   (c) comparing the estimated auto-cumulant of the received waveform attribute samples with a multidimensional higher-order nonzero-lag auto-cumulant of a known waveform to thereby obtain the fingerprint of the received waveform.

13. The method of claim 12 wherein the auto-cumulant of the known waveform is obtained from a database.

14. The method of claim 12 wherein the auto-cumulant of the known waveform is obtained from a lookup table.

15. A method for classifying a received waveform comprising the steps of:
   (a) sampling the received waveform to thereby obtain a predetermined number of samples of an attribute of the received waveform;
   (b) estimating a multidimensional higher-order nonzero-lag auto-cumulant of the received waveform attribute samples; and
   (c) comparing the estimated auto-cumulant of the received waveform attribute samples with a multidimensional higher-order nonzero-lag auto-cumulant of a known waveform to thereby classify the received waveform.

16. The method of claim 15 wherein the attribute is a random process.

17. The method of claim 16 wherein the random process is stationary with statistical properties up to order N+1 that are invariant to a shift in the origin over the sample observations for a fingerprint of dimension N.

18. The method of claim 16 wherein the random process is zero-mean.

19. The method of claim 16 wherein the attribute is selected from the group consisting of phase, frequency, amplitude, power spectral density, symbol rate, symbol energy, bandwidth, modulation, phase jitter, timing jitter, signal constellation, pulse shape and frequency offset.

20. The method of claim 15 wherein the auto-cumulant is a fourth order cumulant.

21. The method of claim 15 wherein the auto-cumulant is determined as a function of three lags.

22. The method of claim 15 wherein the received waveform is classified by modulation type.

23. The method of claim 22 wherein the modulation types are selected from the group consisting of PSK, PAM, and QAM.

24. The method of claim 23 wherein the PSK modulation types are selected from the group consisting of BPSK, QPSK, and 8PSK.

25. The method of claim 23 wherein the QAM modulation types are selected from the group consisting of 16-QAM, 64-QAM, and 256-QAM.

26. The method of claim 15 wherein the auto-cumulant of the known waveform is obtained from a database.

27. The method of claim 15 wherein the auto-cumulant of the known waveform is obtained from a lookup table.

28. A method for characterizing a received waveform comprising the steps of:
   (a) sampling the received waveform to thereby obtain a predetermined number of samples of an attribute of the received waveform;
   (b) estimating a multidimensional higher-order nonzero-lag auto-cumulant of the received waveform attribute samples; and
   (c) comparing the estimated auto-cumulant of the received waveform attribute samples with a multidimensional higher-order nonzero-lag auto-cumulant of a known waveform to thereby characterize the received waveform.

29. The method of claim 28 wherein the attribute is a random process.

30. The method of claim 29 wherein the random process is stationary with statistical properties up to order N+1 that are invariant to a shift in the origin over the sample observations for a fingerprint of dimension N.

31. The method of claim 29 wherein the random process is zero-mean.

32. The method of claim 29 wherein the attribute is selected from the group consisting of phase, frequency, amplitude, power spectral density, symbol rate, symbol energy, bandwidth, modulation, phase jitter, timing jitter, pulse shape, signal constellation, and frequency offset.

33. The method of claim 28 wherein the auto-cumulant is a fourth order cumulant.

34. The method of claim 28 wherein the auto-cumulant is determined as a function of three lags.

35. The method of claim 28 wherein the known waveform is idealized so that the samples of the attribute do not contain anomalous variations.

36. The method of claim 35 wherein the received waveform is characterized by anomalous variations of the attribute in the samples as determined by the difference between the estimated auto-cumulant of the received waveform and the auto-cumulant of the idealized known waveform.

37. The method of claim 28 wherein the auto-cumulant of the known waveform is obtained from a database.

38. The method of claim 28 wherein the auto-cumulant of the known waveform is obtained from a lookup table.

39. A method for identifying a received waveform comprising the steps of:
   (a) sampling the received waveform to thereby obtain a predetermined number of samples of an attribute of the received waveform;
   (b) estimating a multidimensional higher-order nonzero-lag auto-cumulant of the received waveform attribute samples; and
   (c) comparing the estimated auto-cumulant of the received waveform attribute samples with a multidimensional higher-order nonzero-lag auto-cumulant of a known waveform to thereby identify the received waveform.

40. The method of claim 39 wherein the attribute is a random process.

41. The method of claim 40 wherein the random process is stationary with statistical properties up to order N+1 that are invariant to a shift in the origin over the sample observations for a fingerprint of dimension N.

42. The method of claim 40 wherein the random process is zero-mean.

43. The method of claim 40 wherein the attribute is selected from the group consisting of phase, frequency, amplitude, power spectral density, symbol rate, symbol energy, bandwidth, modulation, phase jitter, timing jitter, pulse shape, signal constellation, and frequency offset.

44. The method of claim 40 wherein the auto-cumulant is a fourth order cumulant.

45. The method of claim 40 wherein the auto-cumulant is determined as a function of three lags.

46. The method of claim 40 wherein the auto-cumulant of the known waveform is obtained from a database.

47. The method of claim 40 wherein the auto-cumulant of the known waveform is obtained from a lookup table.

48. A method for intercepting a received waveform comprising the steps of:
   (a) sampling the received waveform to thereby obtain a predetermined number of samples of an attribute of the received waveform;
   (b) estimating a multidimensional higher-order nonzero-lag auto-cumulant of the received waveform attribute samples;
   (c) comparing the estimated auto-cumulant of the received waveform attribute samples with a multidimensional higher-order nonzero-lag auto-cumulant of a known waveform to thereby determine the modulation of the received waveform; and
   (d) processing the received waveform using the determined modulation to thereby intercept the received waveform.

49. The method of claim 48 wherein the attribute is a random process.

50. The method of claim 49 wherein the random process is stationary with statistical properties up to order N+1 that are invariant to a shift in the origin over the sample observations for a fingerprint of dimension N.

51. The method of claim 49 wherein the random process is zero-mean.

52. The method of claim 49 wherein the attribute is selected from the group consisting of phase, frequency, amplitude, power spectral density, symbol rate, symbol energy, bandwidth, modulation, phase jitter, timing jitter, pulse shape, signal constellation, and frequency offset.

53. The method of claim 48 wherein the auto-cumulant is a fourth order cumulant.

54. The method of claim 48 wherein the auto-cumulant is determined as a function of three lags.

55. The method of claim 48 wherein the auto-cumulant of the known waveform is obtained from a database.

56. The method of claim 48 wherein the auto-cumulant of the known waveform is obtained from a lookup table.

57. In a method for classifying a received signal from an unknown emitter using characteristics of the waveform of the received signal, the improvement comprising the steps of:
   (a) determining for the received signal variations of $4^{th}$-order cumulant multidimensional features over a plurality of lag combinations; and
   (b) comparing the $4^{th}$-order cumulant multidimensional features of the received signal with the variations of similar $4^{th}$-order cumulant multidimensional features of a known reference signal to thereby classify the received signal.

* * * * *